United States Patent
Shimizu et al.

(10) Patent No.: US 6,711,335 B1
(45) Date of Patent: Mar. 23, 2004

(54) HEAT RESISTANT OPTICAL FIBER CORE

(75) Inventors: Makoto Shimizu, Yokohama (JP); Yuji Kubo, Yokohama (JP); Tomoyuki Hattori, Yokohama (JP); Katsuyuki Tsuneishi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/979,100
(22) PCT Filed: Jun. 11, 1999
(86) PCT No.: PCT/JP99/03119
§ 371 (c)(1),
(2), (4) Date: Nov. 19, 2001
(87) PCT Pub. No.: WO00/76931
PCT Pub. Date: Dec. 21, 2000
(51) Int. Cl.⁷ .................................. G02B 6/44
(52) U.S. Cl. ....................................... 385/128
(58) Field of Search ................... 385/128, 25

(56) References Cited

U.S. PATENT DOCUMENTS

| | | | | |
|---|---|---|---|---|
| 4,213,672 A | * | 7/1980 | Aulich et al. ............... 385/128 |
| 4,854,668 A | * | 8/1989 | Mayr et al. .................. 385/128 |
| 4,964,694 A | * | 10/1990 | Oohashi et al. ............. 385/128 |
| 5,182,785 A | * | 1/1993 | Savegh et al. .............. 385/128 |
| 5,333,229 A | * | 7/1994 | Sayegh ........................ 385/102 |
| 6,233,374 B1 | * | 5/2001 | Ogle et al. ................... 385/13 |
| 2003/0077059 A1 | * | 4/2003 | Chien et al. ................. 385/128 |
| 2003/0099451 A1 | * | 5/2003 | Walker et al. .............. 385/128 |

FOREIGN PATENT DOCUMENTS

| | | |
|---|---|---|
| JP | 53-32749 | 3/1978 |
| JP | 1-173006 | 7/1989 |
| JP | 2-48437 | 2/1990 |
| JP | 2-232611 | 9/1990 |
| JP | 5-127052 | 5/1993 |

OTHER PUBLICATIONS

"Polyetherimide (PEI)" The Loctite Design Guide for Bonding Plastics, vol. 2, Copyright approximatly 1997–2000, Table of Contents and pp. 44–45.*
Gardner "An investigation of the structure–property relationships for high performance thermoplastic matrix, carbon fiber composites with a tailored polyimide interphase" Dissertation, Aug. 17, 1998, pp. 35–38, 188–190, and 227–228.*

* cited by examiner

Primary Examiner—David V. Bruce
Assistant Examiner—Krystyna Suchecki
(74) Attorney, Agent, or Firm—McDermott, Will & Emery

(57) ABSTRACT

The heat-resistant coated optical fiber in accordance with the present invention comprises a coating portion 20, coated on the outer periphery of an optical fiber 10, comprising a first coating layer 21 consisting of aromatic polyimide resin, a second coating layer 22 consisting of silicone resin, and a third coating layer 23 consisting of moisture-resistant resin with a heat resistance equivalent to that of the first coating layer 21, e.g., PFA.

6 Claims, 2 Drawing Sheets

HEAT RESISTANT OPTICAL FIBER CORE

TECHNICAL FIELD

The present invention relates to a heat-resistant coated optical fiber provided with a heat-resistant coating, which is employed in high-temperature/high-humidity environments.

BACKGROUND ART

As heat-resistant coated optical fibers usable in high-temperature environments, techniques disclosed in JP 1-173006A and JP 5-127052A have been known.

The former relates to a technique in which the outer periphery of an optical fiber is coated with a polyimide resin having a thickness of at least 25 μm but not greater than 300 μm, and states that its outer periphery is preferably further coated with a heat-resistant resin, such as a fluorine resin, equivalent to the polyimide resin. The latter is a technique in which the outer periphery of the optical fiber is coated with polyimide and polytitanocarbosilane. Both of them are described as capable of maintaining a high strength even under a high temperature by using polyimide, which is a heat-resistant resin, in their coating layers as such.

DISCLOSURE OF THE INVENTION

Examples of harsh environments where optical fibers are employed include high-temperature/high-humidity environments such as the inside of nuclear power plants, oil wells, and the like. It has been seen that, in the above-mentioned heat-resistant coated optical fibers, the heat-resistant coating resins and the optical fibers therein deteriorate in such high-temperature/high-humidity environments. This is because that, in a high-humidity environment with a humidity of 60%RH, for example, the imide group is hydrolyzed, whereby aromatic polyimide resins deteriorate. It has been seen that polyamic acid, which is a glass-decomposing gas generated upon this hydrolysis, deteriorates the optical fiber glass therein.

In order to overcome the above-mentioned problem, the heat-resistant coated optical fiber in accordance with the present invention comprises a first coating layer consisting of aromatic polyimide resin, covering an outer periphery of an optical fiber; a second coating layer consisting of silicone resin, covering an outer periphery of the first coating layer; and a third coating layer consisting of moisture-resistant resin, covering an outer periphery of the second coating layer and having a heat resistance equivalent to that of the first coating layer.

In accordance with the present invention, each of the first, second, and third coating layers has a heat resistance, so that the coating would not deteriorate even in high-temperature environments. Also, since the first coating layer, which may hydrolyze in a high-humidity environment, and the second coating layer are covered with the moisture-resistant third coating layer, steam is kept from penetrating into the first and second coating layers, whereby the deterioration in strength caused by hydrolysis can be suppressed. Further, the second coating layer can enhance the adherence between the first and third coating layers.

The thickness of the first coating layer is preferably at least 0.01 μm in order to protect the surface of optical fiber glass against the moisture in atmosphere, and is preferably not greater than 20 μm in order to improve productivity.

Also, the thickness of the second coating layer is preferably at least 5 μm in order to suppress the hydrolysis and secure a favorable lateral pressure characteristic, and is preferably not greater than 200 μm in order to suppress the deterioration in transmission characteristics caused by thermal shrinkage of the coating layer and the worsening of productivity.

Further, the thickness of the third coating layer is preferably at least 0.01 μm in order to secure heat resistance/moisture resistance characteristics, and is preferably not greater than 500 μm in order to suppress the deterioration in transmission characteristics caused by thermal shrinkage of the coating layer and the worsening of productivity.

The degree of cure of the first coating layer is preferably at least 0.30 in order to suppress the hydrolysis of polyimide.

From the viewpoint of heat resistance/moisture resistance characteristics and easiness in manufacture required for the third coating layer, it is preferably made of a fluorine resin.

A carbon coating may further be provided between the optical fiber and the first coating layer. In this configuration, glass-decomposing gases are kept from reaching the optical fiber even when the polyimide resin constituting the first coating layer is hydrolyzed.

BEST MODES FOR CARRYING OUT THE INVENTION

In the following, preferred embodiments of the present invention will be explained in detail with reference to the accompanying drawings.

Figure 1:
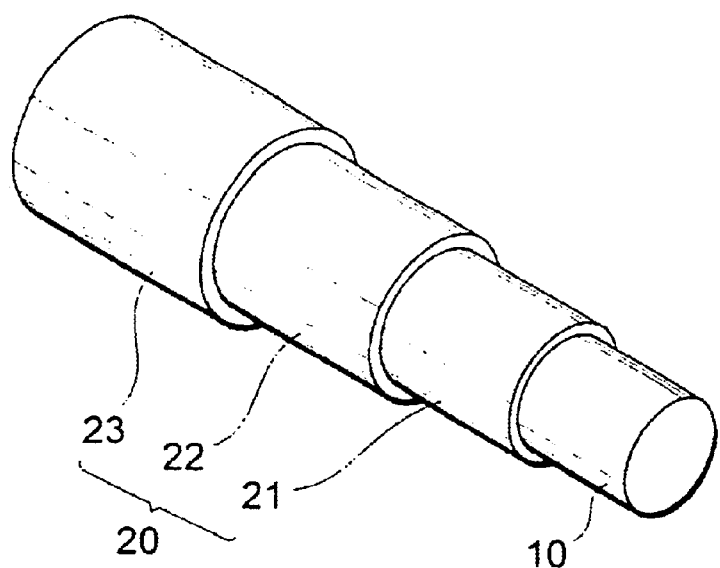
FIG. 1 is a perspective view showing the structure of a first embodiment of the heat-resistant coated optical fiber in accordance with the present invention.

FIG. 1 is a perspective view showing the structure of a first embodiment of the heat-resistant coated optical fiber in accordance with the present invention. Here, it is illustrated in a state where the coating is partly eliminated in a hierarchical fashion so that its coating structure can be seen easily.

This heat-resistant coated optical fiber is constituted by an optical fiber 10, made of silica-based glass, having a core portion and a cladding portion; and a coating 20, formed on the outer periphery thereof, comprising a first coating layer 21 made of aromatic polyimide resin, a second coating layer 22 made of silicone resin, and a third coating layer 23 made of PFA (tetrafluoroethylene perfluoroalkylvinylether copolymer).

Here, the thickness of the first coating layer 21 is preferably 0.01 μm to 20 μm. If the thickness of the first coating layer 21 is less than 0.01 μm, then it cannot fully protect the surface of optical fiber glass against the moisture in atmosphere. If it is thicker than 20 μm, by contrast, then the deterioration in productivity becomes problematic. Namely, while the first coating layer 21 is formed as a resin is cured by evaporating organic solvents upon heating, the heating must be carried out slowly in order to prevent bubbles from occurring within the resin at the time of heating in order to form a coating exceeding 20 μm at once, whereby the manufacturing speed may lower. Also, if a coating exceeding 20 μm is to be formed by multilayer coating of the same resin, the equipment will be complicated, whereby the manufacturing cost will rise.

Preferably, the degree of cure of the first coating layer is at least 0.30. Here, the degree of cure of a polyimide resin takes account of the fact that the imide group is generated along with the curing of the polyimide resin, and refers to the value measured by the following measuring method. For measurement, FT-IR (Fourier transform infrared spectrometer) was used, and the ratio in strength (A/B) of the peak A, which was a peak value of the imide group, within the wave number range of 1753.60 to 1810.0 cm$^{-1}$ to the peak B, which was a peak value of the benzene ring, within the wave number range of 1463.15 to 1521.85 cm$^{-1}$ was determined. While using ZnSe as an ATR (attenuated total reflectance) crystal and setting the number of integrating operations to 256, the measurement was carried out twice or more for each sample, and the average value of the resulting strength ratios (A/B) was taken as the degree of cure. If thus determined degree of cure is less than 0.30, then it becomes difficult to suppress hydrolysis in high-temperature/high-humidity environments.

Preferably, the thickness of the second coating layer 22 is 5 μm to 200 μm. If the thickness of the second coating layer 22 is less than 5 μm, then not only it becomes difficult to suppress the hydrolysis of the first coating layer 21, but also favorable lateral pressure characteristics are hard to secure. If it is thicker than 200 μm, by contrast, then the deterioration in transmission characteristics caused by thermal shrinkage of the coating layer and the worsening of productivity become problematic. Since the second coating layer 22 is formed by curing a resin with heat, the manufacturing cost inevitably rises due to the decrease in manufacturing speed and the complication of equipment in order to form a thick coating.

The thickness of the third coating layer 23 is preferably 0.01 to 500 μm. It becomes hard to secure heat resistance/moisture resistance if the third coating layer 23 is thinner than 0.01 μm; whereas the deterioration in transmission characteristics caused by thermal shrinkage of the coating layer and the worsening of productivity become problematic, as in the second coating layer, if the third coating layer 23 is thicker than 500 μm.

Figure 2:
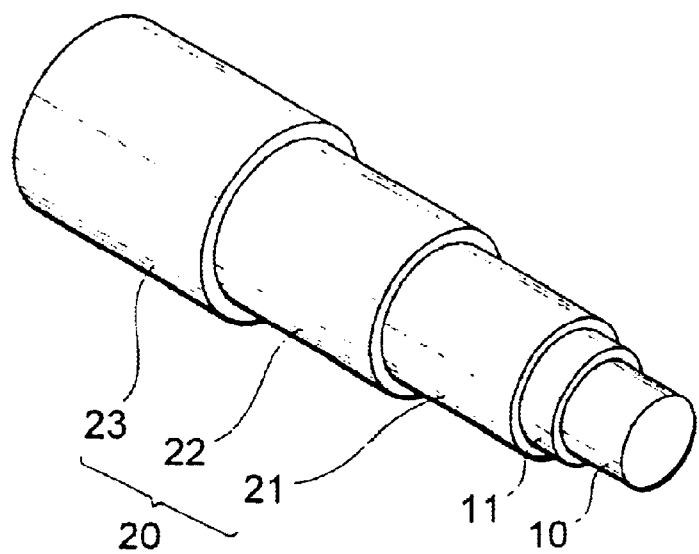
FIG. 2 is a perspective view showing the structure of a second embodiment of the heat-resistant coated optical fiber in accordance with the present invention.

FIG. 2 is a perspective view showing the structure of a second embodiment of the heat-resistant coated optical fiber in accordance with the present invention. This embodiment differs from the first embodiment shown in FIG. 1 only in that a carbon coating 11 is provided between the outer periphery of the optical fiber 10 and the coating portion 20 covering the same. From the viewpoint of productivity, the thickness of the carbon coating 11 is preferably 0.1 μm or less.

Even if a glass-decomposing gas is generated in the coating portion 20, the carbon coating 11 can prevent the glass-decomposing gas from reaching the optical fiber 10, thereby being able to suppress the deterioration in optical fiber 10.

The inventors carried out a comparative test for evaluating the heat resistance/moisture resistance of heat-resistant coated optical fibers in accordance with the present invention. The results will be reported in the following.

Table 1 shows the structures of optical fibers used for the comparative test.

TABLE 1

Structures of Coated Optical Fibers Used for Comparative Test

Figure 3:
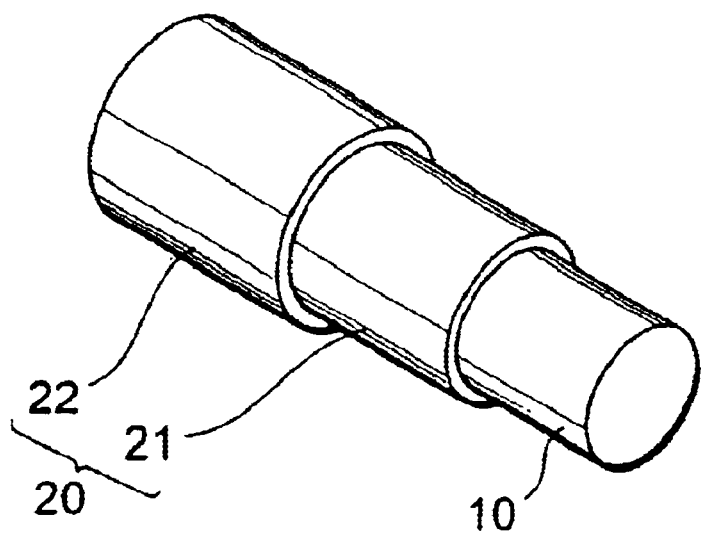
FIG. 3 is a perspective view showing the structure of a conventional heat-resistant coated optical fiber subjected to a comparative test with heat-resistant coated optical fibers in accordance with the present invention.

| | | 1st layer | | | 2nd layer | | 3rd layer | |
|---|---|---|---|---|---|---|---|---|
| samp. | str. | mat. | OD (μmφ) | deg. of cure | mat. | OD (μmφ) | mat. | OD (μmφ) |
| A | FIG. 1 | polyimide | 140 | 0.30 | silicone | 400 | PFA | 700 |
| B | FIG. 1 | polyimide | 140 | 0.30 | silicone | 400 | nylon | 900 |
| C | FIG. 3 | polyimide | 140 | 0.31 | silicone | 400 | — | — |
| D | FIG. 3 | silicone | 400 | — | PFA | 700 | — | — |
| E | FIG. 1 | polyimide | 140 | 0.28 | silicone | 400 | PFA | 700 |
| F | FIG. 2 | polyimide | 140 | 0.30 | silicone | 400 | PFA | 700 |

The outside diameter (OD) of the optical fiber 10 in each of the coated optical fibers of samples A to F was 125 μm, whereas the thickness of the carbon coating 11 of the coated optical fiber of sample F was 0.05 μm. FIG. 3 is a view showing the structure of a conventional coated optical fiber, corresponding to samples C and D.

Using these heat-resistant coated optical fibers, their strength characteristics before and after aging for 16 days in a high-temperature/high-humidity environment of 250° C./95%RH were evaluated. This strength characteristic evaluation was in conformity to the measuring method specified in IEC 60793-1-B2, and the measurement was carried out under conditions with a sample length of 300 mm and a pulling rate of 100%/min. Table 2 summarizes the results thereof. For these results of evaluation, the median of 20 samples is shown.

TABLE 2

Results of Strength Characteristic Evaluation for Comparative Test (unit: kgf)

| sample | A | B | C | D | E | F |
|---|---|---|---|---|---|---|
| Initial | 6.88 | 6.72 | 6.64 | 6.69 | 6.72 | 6.97 |
| 8 days after | 6.88 | 5.64 | 5.71 | 6.15 | 6.04 | 6.96 |
| 16 days after | 6.89 | 4.22 | 4.19 | 5.50 | 5.24 | 6.97 |

As can be seen from this table, only the samples A and F maintained their initial strengths after the aging of 16 days. By contrast, the samples C, D, which were conventional heat-resistant coated optical fibers, lowered their strengths by 37% and 18%, respectively, after 16 days. Also, the sample B, whose structure was nearly identical to that of the optical fiber in accordance with the present invention except that the third coating layer 23 was formed from nylon, lowered its strength by 37% after 16 days. The sample E, in which the degree of cure of the first coating layer 21 was 0.28 and thus was lower than that in the sample A, lowered its strength by 22% after 16 days.

In view of the foregoing results of test, it has been verified that the structure of the optical fiber in accordance with the present invention, i.e., the coating portion 20 of a three-layer structure made of polyimide, silicone resin, and PFA in which the degree of cure of polyimide, constituting the first coating layer 21, is set to 0.30 or greater, is favorable.

Though examples in which PFA is employed as the third coating layer 23 has been explained in the foregoing, the third coating layer 23 is not restricted thereto, and resins having heat resistance/moisture resistance equivalent to that of PFA, such as fluorine resins like polytetra-fluoroethylene, tetrafluoroethylene/hexafluoropropylene copolymer, tetrafluoroethylene/ethylene copolymer, and polyvinylidene fluoride, polyamide imide, polyether sulfone, polyphenyl sulfone, polyether ether ketone, and the like can be employed, for example.

Industrial Applicability

The heat-resistant coated optical fiber in accordance with the present invention is favorably usable in high-temperature/high-humidity environments such as nuclear power plants and oil wells.

What is claimed is:

1. A heat-resistant coated optical fiber comprising:

a first coating layer consisting of aromatic polyimide resin and covering an outer periphery of an optical fiber;

a second coating layer consisting of silicone resin and covering an outer periphery of said first coating layer; and a third coating layer consiting of moisture-resistant resin, covering an outer periphery of said second coating layer and having a heat resistance equivalent to that of said first coating layer.

2. A heat-resistant coated optical fiber according to claim 1, wherein said first coating layer has a thickness of 0.01 μm to 20 μm.

3. A heat-resistant coated optical fiber according to claim 1, wherein said second coating layer has a thickness of 5 μm to 200 μm.

4. A heat-resistant coated optical fiber according to claim 1, wherein said first coating layer has a degree of cure of at least 0.30.

5. A heat-resistant coated optical fiber according to claim 1, wherein said third coating layer consists of fluorine resin.

6. A heat-resistant coated optical fiber according to claim 1, further comprising a carbon coating between said optical fiber and said first coating layer.

* * * * *